Jan 6, 1931.  L. H. ZEUN  1,787,966
BUTTER FOR TOBACCO STEMMING MACHINES
Filed March 6, 1928   3 Sheets-Sheet 3

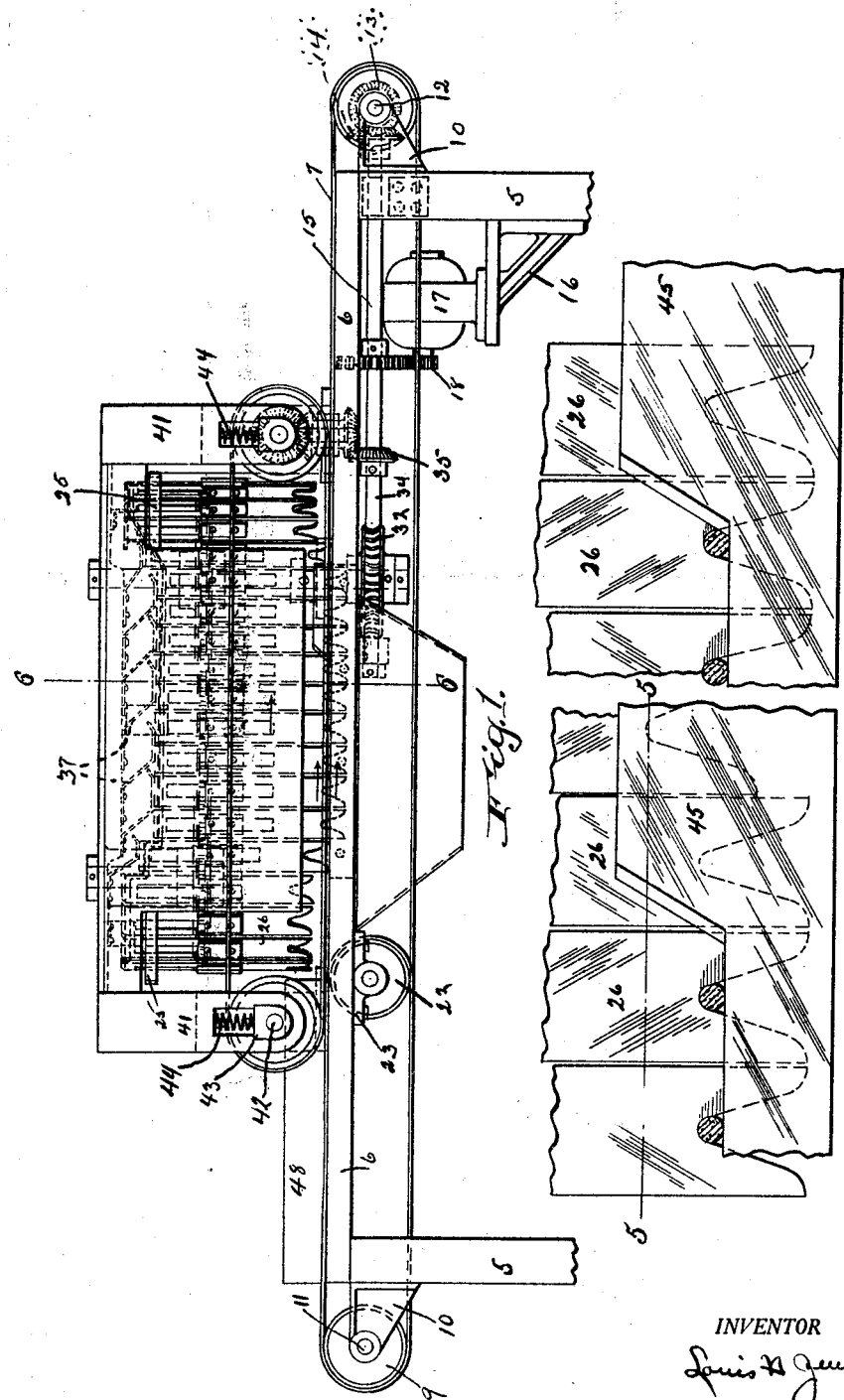

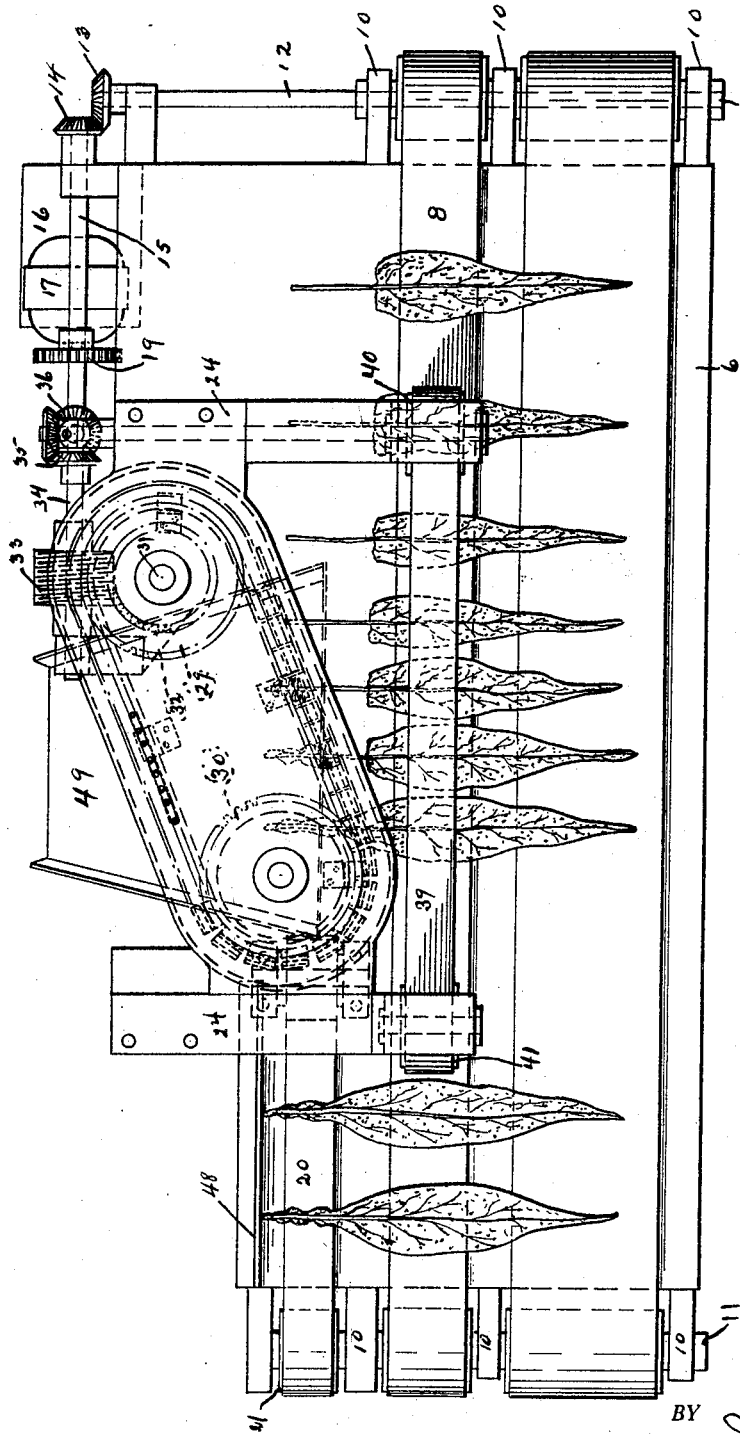

INVENTOR.
Louis H. Zeun
BY J. T. Dowling
ATTORNEYS.

Patented Jan. 6, 1931

1,787,966

UNITED STATES PATENT OFFICE

LOUIS H. ZEUN, OF CATONSVILLE, MARYLAND, ASSIGNOR OF ONE-THIRD TO JOHN B. ADT AND ONE-THIRD TO ALBERT W. ADT, BOTH OF BALTIMORE, MARYLAND

BUTTER FOR TOBACCO-STEMMING MACHINES

Application filed March 6, 1928. Serial No. 259,448.

This invention relates to improvements in butters for tobacco stemming machines, particularly that type wherein the leaves are individually stripped from the stems.

The particular object of this invention is the provision of a butter capable of stripping a portion of the leaves from the butt ends of the stems prior to the engagement of the stems by leaf carrying members of tobacco stemming and stripping machines.

A further object of this invention is the provision of a butter consisting of a plurality of independently yieldable stem engaging members connected in a continuous unit so that the butt ends of the stems may be independently engaged and a portion of the leaf stripped therefrom to permit said stems to be freely and accurately engaged by the stripping fingers of a tobacco stemming and stripping machine.

A further object of this invention is the provision of a butter comprising a plurality of independent stem engaging members connected together in a continuous band and rotatably mounted about a cam track, so that positive independent engagement of the butt ends of tobacco leaf stems may be assured.

Another object of the invention is the provision of such mechanism wherein the leaves may be retained and anchored over a moving traveling apron, so as to permit the butter to engage and remove a portion of the leaves from the stems without movement laterally of the leaves.

A still further object of the invention is the provision of a knife, so associated with the butter that the terminals of the butt ends of the stems may be severed, should they be of unusual size or dimension, as to make stripping of the leaves therefrom impossible.

A still further object of the invention is the provision of a butter comprising a plurality of independently yieldable teeth members connected together in a unit and provided with means for rotating the same continuously, so that a given portion of the leaves may be stripped from the butt ends of the stems prior to the entrance of the leaves to the stripping machine.

With these and other objects in view, the invention consists in certain novel features, combination and arrangement of parts as will be hereinafter more fully described, illustrated in the accompanying drawings, and claimed.

In the drawings,

Figure 1 is a side elevational view of my improved butter, as applied to a tobacco stemming machine;

Figure 2 is a top plan view of my improved butter, illustrating the method of operation and the manner of feeding the leaves thereto;

Figures 3 and 4 represent a fragmentary enlarged detailed side elevational view of the independently yieldable teeth, constituting the butter and illustrating the method of holding the butt ends of the stems in their gradual traveling process, with their initial engagement with the teeth until they pass beyond the severing knife;

Figure 5:
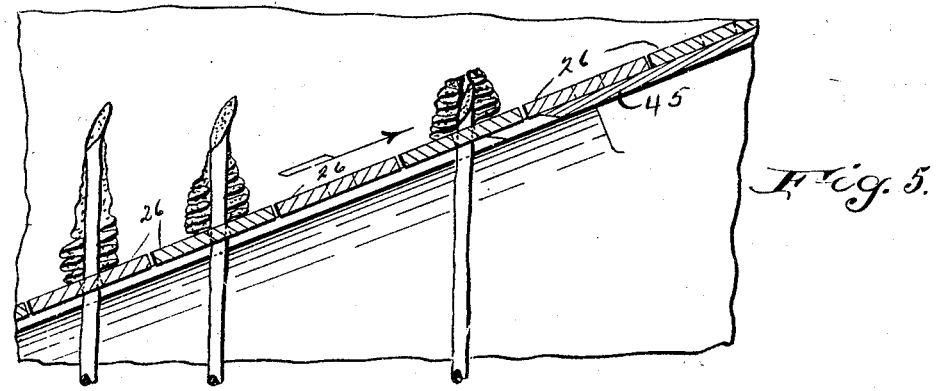
Figure 5 is a transverse sectional view, taken on the line 5—5 of Figure 3.
Figure 7:
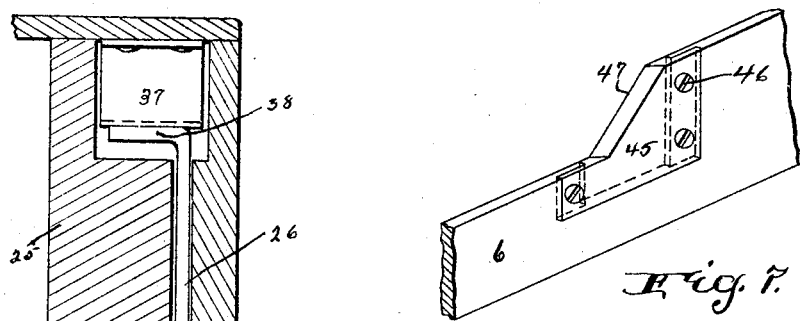
Figure 7 is a detailed perspective view, illustrating a removable knife.
Figure 6:
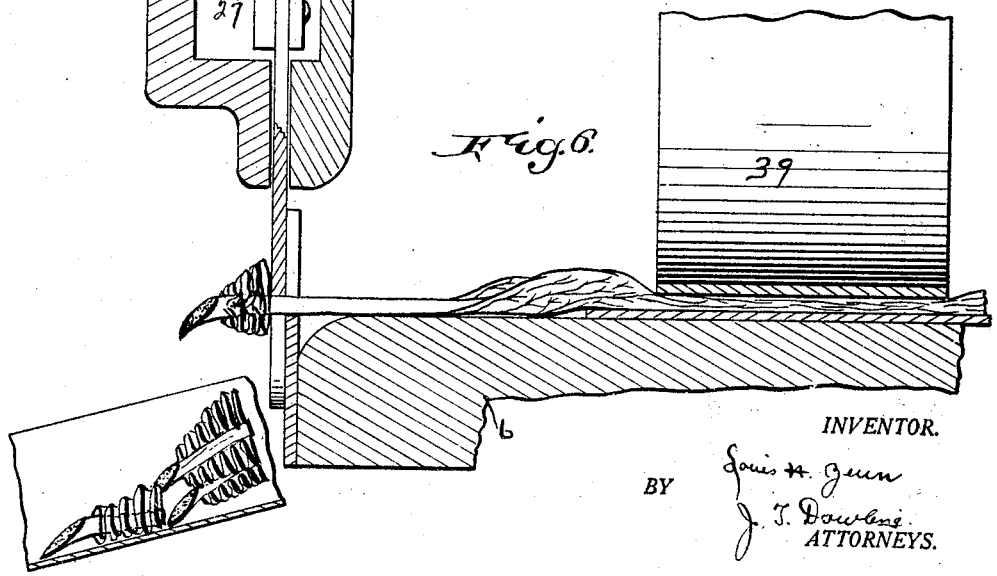
Figure 6 is a vertical sectional view, taken on the line 6—6 of Figure 1.

This invention particularly relates to that type of tobacco stemming and stripping machines illustrated in the co-pending applications, Serial Nos. 210,490, 246,462 and 256,397, filed August 4, 1927, January 13, 1928, and February 23, 1928, respectively. In the co-pending applications, there is shown and described a tobacco stemming and stripping machine embodying means for conveying the leaves from a receiving end of a table to an outlet end, and during the travel of the leaves the stems are stripped therefrom without destroying the body of the leaves, and it is to this particular type of machine that my improved butter is adapted.

My improved butter comprises in its construction a plurality of supports 5, having secured to their upper ends a table 6, over which table travels the conveying belts 7 and 8, respectively. These belts are trained over suitable pulleys 9 mounted in brackets 10 carried at opposite ends of the table by the supports 5. The pulleys 9 are mounted upon suitable shafts 11 and 12, respectively, and the shaft 12 is equipped at one end with a gear 13, which in turn meshes with a gear 14, which is mounted on a shaft 15.

Located under the table 6 and mounted on a bracket 16, carried by the supports 5, is a motor 17 equipped with a gear 18, which meshes with a gear 19 carried by the shaft 15, through the medium of which gears and motor the shafts 11, 12, and 15, may be rotated, which in turn will rotate and control the movement of the belts or aprons 7 and 8, respectively.

The belts or aprons 7 and 8, respectively, are the feeding means for conveying the leaves from one end of the table to the opposite end thereof, and during this conveying action the butt ends of the stems are stripped, as clearly illustrated in Figure 2, to permit said stems to be free to be grasped by the leaf engaging and carrying members of a stripping machine.

To assure an even and uniform feeding means of the leaves, there is provided a belt 20, which is trained over a pulley 21 mounted on one end of the shaft 11. The free end of this belt is trained over a pulley 22 carried by suitable brackets 23 on the underside of the table and at a point adjacent the feeder end of the butter proper. This belt 20 is rotated by virtue of the shaft 11, which is rotated through the medium of the shafts 12, 15, and motor 17.

Mounted above said table in suitable supports 24, is a track or guide member 25, in which is slidably mounted a plurality of yieldable teeth 26. The teeth are carried by suitable holders 27, which are connected in a single series by a driving chain 28. This chain is rotatably mounted about a driving pulley 29 and an idler pulley 30. The drive pulley is rotated by a shaft 31, which shaft has its lower end provided with a gear 32, which meshes with a worm 33 mounted on a shaft 34. The free end of the shaft 34 is provided with a gear 35, which in turn meshes with a gear 36 carried by the shaft 15. Thus it can be seen that a continuous rotational motion of the teeth of the butter is assured.

The construction of the guide 25 and teeth 26 is identical with the construction shown as described in my co-pending application No. 246,462, filed January 23, 1928.

To provide a means whereby these teeth may be yieldably held in contact with the stems of tobacco leaves, there is arranged in said guides suitable springs 37, which have contact with the angular ends 38 of the independent yieldable teeth members 26.

To provide a means whereby these teeth may be held during the stripping of the butt ends thereof, there is mounted over the table 6 a presser band 39, which is mounted and trained over suitable pulleys 40 journaled in supports 41. These pulleys are mounted on suitable shafts 42 carried by bearings 43, which bearings are permitted to move vertically in said supports 41, by virtue of the resilient elements 44. This resilient action of the presser band 39 is to permit a slight raising of said pressure band to compensate for leaves of various thicknesses.

It is a well known fact in stripping tobacco that leaves have stems of various sizes. The terminals of the butt ends of said stems are oftentimes enlarged and cause serious complications during the stripping action, due to the fact that these enlarged ends will not pass through the stripper. To overcome this serious objection, there is secured to a portion of the table 6, a knife 45, which is removable by virtue of the fastening elements 46. The removability of this knife 45 permits the cutting edge 47 to be resharpened, or the knife as a whole, replaced at the will of the operator.

When tobacco leaves are fed in the receiving end of the machine, they are laid against a suitable guide 48 with the terminals of their butt ends contacting therewith, and the leaves laid flat on the belts 7, 8, and 20, respectively. Upon rotation of these belts the leaves will be fed laterally or carried laterally under the presser band 39 and the butt ends of the stems will be engaged by the vertical dropping of the teeth 26, and due to the relative position of said butter, which is set at an angle to the feeding belts, a portion of the leaves will be stripped from the butt ends of the stems, leaving them free and unencumbered so as to assure a positive engagement between the stems and the stripping means of the stemming machine.

In the event that the terminals of the butt ends of these stems should be unnecessarily large, they will be severed therefrom during the lateral movement thereof by contact with the knife.

To provide a means whereby the butts or strippings from the butt ends of the stems may be saved, as it is important that they should be saved, there is provided a chute 49, which is connected to and extends laterally from said table beneath the butter proper, and the leaves and butt ends of the stems, after the stripping action is completed, will fall into said chute and be conveyed to a proper receptacle.

It can be readily seen that when the motor is energized, that the shafts will be rotated, which in turn will rotate the butter, the aprons, and presser band, and it is then only necessary to feed the tobacco, as illustrated in Figure 2, and the butt ends will be cleanly stripped from the stems for the purpose desired.

Having thus described my invention, what I claim as new is:

1. A butter for tobacco stemming and stripping machines, comprising a support, feeding aprons movable over said support, a plurality of independently yieldable teeth connected in a unit and mounted above said support, a cam track and guide for said tooth unit, to permit individual engagement of the teeth with the butt ends of the tobacco stems, a presser band for said leaves, and a means for rotating said butter, presser band and feeding means.

2. A butter for tobacco stemming and stripping machine, comprising a support, leaf feeding aprons mounted on said support, means for continuously moving said aprons, a plurality of independently yieldable teeth connected in a continuous unit mounted above said support, a cam track and guide for said teeth, whereby they may have independent engagement with the butt ends of tobacco leaf stems, a resiliently mounted presser band mounted above said support and in close proximity to said butter, said presser band adapted to be rotated so as to retain said leaves against lateral movement on the aprons during the action of the butter in removing the butt ends of the stems.

3. A butter for tobacco stemming machines, comprising a plurality of independently yieldable teeth, means for connecting said teeth in a continuous unit, a cam track for said teeth, resilient means engaging said teeth, a presser band, means for rotating said teeth and presser band, and a removable knife associated with said teeth to sever said tobacco leaf stems passing thereover.

In testimony whereof he hereunto affixes his signature.

LOUIS H. ZEUN.